United States Patent [19]
Miyazaki

[11] Patent Number: 6,109,115
[45] Date of Patent: *Aug. 29, 2000

[54] STRESS COMPOSITE SENSOR AND STRESS MEASURING DEVICE USING THE SAME FOR STRUCTURE

[75] Inventor: Nagao Miyazaki, Osaka, Japan

[73] Assignee: Japan Electronics Industry, Limited, Osaka, Japan

[ * ] Notice: This patent is subject to a terminal disclaimer.

[21] Appl. No.: 09/031,857

[22] Filed: Feb. 27, 1998

Related U.S. Application Data

[63] Continuation of application No. 08/524,858, Sep. 7, 1995, Pat. No. 5,723,792.

[30] Foreign Application Priority Data

Sep. 14, 1994 [JP] Japan ................................. 6-257715

[51] Int. Cl.[7] .................................................. G01N 3/00
[52] U.S. Cl. ........................................ 73/794; 73/862.044
[58] Field of Search ........................... 73/767, 768, 794, 73/819, 769, 862.044

[56] References Cited

U.S. PATENT DOCUMENTS

| | | | |
|---|---|---|---|
| 3,879,995 | 4/1975 | Libertiny | 73/862.044 |
| 3,915,015 | 10/1975 | Crane et al. | 73/865.4 |
| 4,448,083 | 5/1984 | Hayashi | 73/862.042 |
| 5,507,187 | 4/1996 | Miyazaki | 73/769 |
| 5,569,857 | 10/1996 | Miyazaki | 73/785 |
| 5,723,792 | 3/1998 | Miyazaki | 73/769 |
| 5,872,320 | 2/1999 | Kamentser et al. | 73/862.044 |

*Primary Examiner*—Max Noori
*Attorney, Agent, or Firm*—Jordan and Hamburg LLP

[57] ABSTRACT

A stress composite sensor has sensor elements each including a base plate having a rectangular configuration and a first main surface and a second main surface opposite the first main surface, a pair of first strain gauges disposed on the first main surface crossing one another, a pair second strain gauges disposed on a the second main surface crossing one another, the first pair of strain gauges and the second pair of strain gauges being symmetrically disposed with respect to a center plane of the base plate; and bridge circuits incorporating the first pair of strain gauges and the second pair of strain gauges. The sensor elements include X-sensor elements for measuring stress in an X-direction, Y-sensor elements for measuring stress in a Y-direction, and Z-sensor elements for measuring stress in a Z-direction. Arithmetic circuits calculate stress from outputs of the bridge circuits. The X-sensor elements have edge portions orthogonally joined to edge portions of the Y-sensor elements to form L-shaped sensor segments and the Z-sensor elements are each edgewise joined to ones of the L-shaped sensor segments orthogonal to the X-sensor elements and the Y-sensor elements thereby forming three plane sensor segments having three contiguous faces of a parallelepiped and to output X-, Y- and Z-direction stress signals. The three plane sensor segments are joined together in a matrix to form one assembled body.

17 Claims, 19 Drawing Sheets ent Ser. No. 08/524,
STRESS COMPOSITE SENSOR AND STRESS MEASURING DEVICE USING THE SAME FOR STRUCTURE This is a continuation, of application Ser. No. 08/524, 858, filed Sept. 7, 1995. U.S. Pat. No. 5,723,792

BACKGROUND OF THE INVENTION

The present invention relates to a stress composite sensor and a stress measuring device using the same for a structure, for measuring stresses, such as shearing stresses, or shearing strains, produced in a structure such as an automobile, airplane, railroad vehicle, crane, robot or the like.

Methods for measuring stresses, such as shearing stresses, or shearing strains, produced in a structure such as an automobile, airplane, railroad vehicle, crane, robot or the like, include the photoelasticity method, brittle coating method, acoustic method, holographic method and strain gauge method, of which generally the strain gauge method has been used most frequently.

Such mechanical quantity sensors are various in kind and easy to handle, but when used for measuring stresses, they have to be equipped with transducers. Further, in the strain gauge method, the strain gauge is subjected to stresses in every direction and hence analysis is required.

Further, a stress sensor comprising a conventional mechanical quantity sensor such as a strain gauge, when singly used on a structure, receives greater amounts of other stresses than the main stress depending upon the position where it is attached; thus, a plurality of stress sensors have to be used and such stress sensor has to be attached to the neutral point where other stresses than the main stress are not transmitted or reduced, making it necessary to find the neutral point possessed by the structure and to attach a stress sensor to the neutral point accurately.

SUMMARY OF THE INVENTION

With the above in mind, the present invention provides an arrangement wherein instead of singly using stress sensors (mechanical quantity sensors) comprising strain gauges, a plurality of stress sensors are composited or integrated to provide an integral stress composite sensor, which is mounted on a structure such as an automobile whose stresses are to be measured, and X-, Y- and Z-axis direction stress signals obtained from the single-packaged stress composite sensor are selectively used to measure stresses.

The present invention includes a plurality of stress sensors or a plurality of rows of stress sensors comprising strain gauges are integrated by being fixed on the same plane of a base plate at intervals, so that each stress sensor delivers stress signals in one direction alone or a selected stress sensor delivers stress signals in one direction alone.

The present invention provides stress sensors comprising strain gauges fixed on the individual surfaces of base plates placed in two mutually orthogonal planes and thereby integrated to provide a sensor segment, a plurality of such sensor segments or a plurality of rows of such sensor segments being connected together or superposed and connected together to form an integral body, so that each sensor segment delivers stress signals in two directions or a selected sensor segment delivers stress signals in two directions.

The present invention also provides stress sensors comprising strain gauges fixed on the individual surfaces of base plates placed in three mutually orthogonal planes and thereby integrated to provide a sensor segment, a plurality of such sensor segments or a plurality of rows of such sensor segments being connected together or superposed and connected together to form an integral body, so that each sensor segment delivers stress signals in three directions or in selected directions or a selected sensor segment delivers stress signals in three directions.

The present invention further provides a signal processing circuit such as a bridge circuit of strain gauges or an amplifying circuit integrally formed on the same base plate as that of a stress composite sensor as described above.

The present invention still further provides for a hole formed in the stress concentration region of a structure whose stresses are to be measured and a stress composite sensor being selectively installed, so that X-axis, X- and Z-axis or X-, Y- and Z-axis direction shearing strains produced in the structure are selectively measured corresponding to the selected stress composite sensor.

The present invention additionally provides a stress measuring device for a structure described above, when shearing strains produced in the structure are to be sensed, at least one or more necessary sensors or sensor segments of the stress composite sensor being sorted for stress measurement.

The present invention yet further provides a stress composite sensor as described above being selectively installed in a hole formed in the stress concentration region of a structure whose stresses are to be measured, thereby making it possible to measure stresses in a particular direction or summed stress signals from a plurality of sorted sensor segments by means of sorted stress signals in the X- and Y-axis or X-, Y- and Z-axis directions of the structure.

The present invention further still provides a stress composite sensor as described above being installed in a hole formed in the stress concentration region of a structure whose stresses are to be measured, and the stress sensors in a plurality of selected sensor segments alone in the X-axis, X- and Y-axis or X-, Y- and Z-axis directions of the structure are employed for sensing and their stress signals are separated according to the X-, Y- and Z-axis directions, such separated stress signals being respectively added together to provide stress signals which are subjected to comparative computation for stress measurement.

The present invention also provides in a stress measuring device for a structure described above, when a necessary sensor segment is sorted for stress measurement, a plurality of stress signals of the sensor segments along a stress layer having relatively little mixing of other stresses produced in the structure being derived and combined for stress measurement.

The present invention also in a stress measuring device for a structure described above, stresses in the X- and Z-axis or X-, Y- and Z-axis directions being sorted to measure stresses in the necessary directions, the resulting stress signals being used as control parameters.

According to the invention, a plurality of stress sensors or a plurality of rows of stress sensors comprising strain gauges are integrated by being fixed on the same base plate, whereby each stress sensor in the single package delivers signals in one direction alone or a selected stress sensor delivers stress signals in one direction alone, and hence stresses in one direction can be measured.

According to the present invention, stress sensors comprising strain gauges are fixed on the individual surfaces of base plates placed in two mutually orthogonal planes and thereby integrated to provide a sensor segment, a plurality of such sensor segments or a plurality of rows of such sensor segments being connected together or superposed and connected together to form an integral body, so that each sensor segment in a single package delivers stress signals in two directions or a selected sensor segment delivers stress signals in two directions alone and hence stresses in two directions can be measured.

According to the present invention, stress sensors comprising strain gauges are fixed on the individual axis surfaces of base plates placed in three mutually orthogonal planes and thereby integrated to provide a sensor segment, a plurality of such sensor segments or a plurality of rows of such sensor segments being connected together or superposed and connected together to form an integral body, so that each sensor segment in a single package delivers stress signals in three directions or a selected sensor segment delivers stress signals in three directions. Thus, stresses in three directions can be measured.

According to the present invention, a signal processing circuit such as a bridge circuit of strain gauges or an amplifying circuit is integrally formed on the base plate for the stress sensor or sensor segment; thus, the measuring function can be improved to increase reliability.

According to the present invention, a single-packaged stress composite sensor described in claims 1 through 4 is selectively installed in a hole formed in the stress concentration region of a structure, whereby X-axis, X- and Z-axis or X-, Y- and Z-axis direction shearing strains produced in the structure or 1-, 2- or 3-direction stresses corresponding to the selected stress composite sensor can be selected and measured.

According to the present invention as described above, when shearing strains produced in a structure are to be sensed, at least one or more necessary sensors or sensor segments of the stress composite sensor are sorted for stress measurement, whereby stresses in any desired direction and an amount of change in said stresses can be derived and accurately measured.

According to the present invention as described above, a stress composite sensor capable of measuring stresses in a single direction or a plurality of directions is selectively installed in a hole formed in the stress concentration region of a structure, whereby stresses in a particular direction or summed stress signals from a plurality of sorted sensor segments can be derived by means of sorted stress signals in the X-axis, X- and Z-axis or X-, Y- and Z-axis directions of the structure and thus stresses can be measured.

According to the present invention as described above, a stress composite sensor capable of measuring stresses in a single direction or a plurality of directions is installed in a hole formed in the stress concentration region of a structure, and a plurality of selected sensor segments alone in the X-axis, X- and Y-axis or X-, Y- and Z-axis directions are employed for sensing and their stress signals are separated according to the X-, Y- and Z-axis directions, such separated stress signals being respectively added together for comparative computation of the resulting stress signals so as to measure stresses with increased accuracy.

According to the present invention as described above, in a stress measuring device for a structure described above, when necessary sensor segments are sorted for stress measurement, a plurality of stress signals of the sensor segment along a stress layer having relatively little mixing of other stresses produced in the structure are derived and combined for stress measurement; thus, stresses not influenced by cross talk are easily measured.

According to the present invention as described above, in a stress measuring device for a structure described above, stresses in the X- and Z-axis or X-, Y- and Z-axis directions are sorted to measure stresses in the necessary directions, the resulting stress signals being used as control parameters; thus, it is possible to construct a highly reliable control system adapted to accurately derive stresses in necessary directions alone.

DESCRIPTION OF THE PREFERRED EMBODIMENTS

What is shown herein is an example of preferred mode of embodiment and the scope of the present invention is not limited by embodiments shown herein.

The present invention will now be described with reference to illustrated embodiments showing examples of a stress measuring device applied to a vehicle, particularly an automobile.

Figure 1:
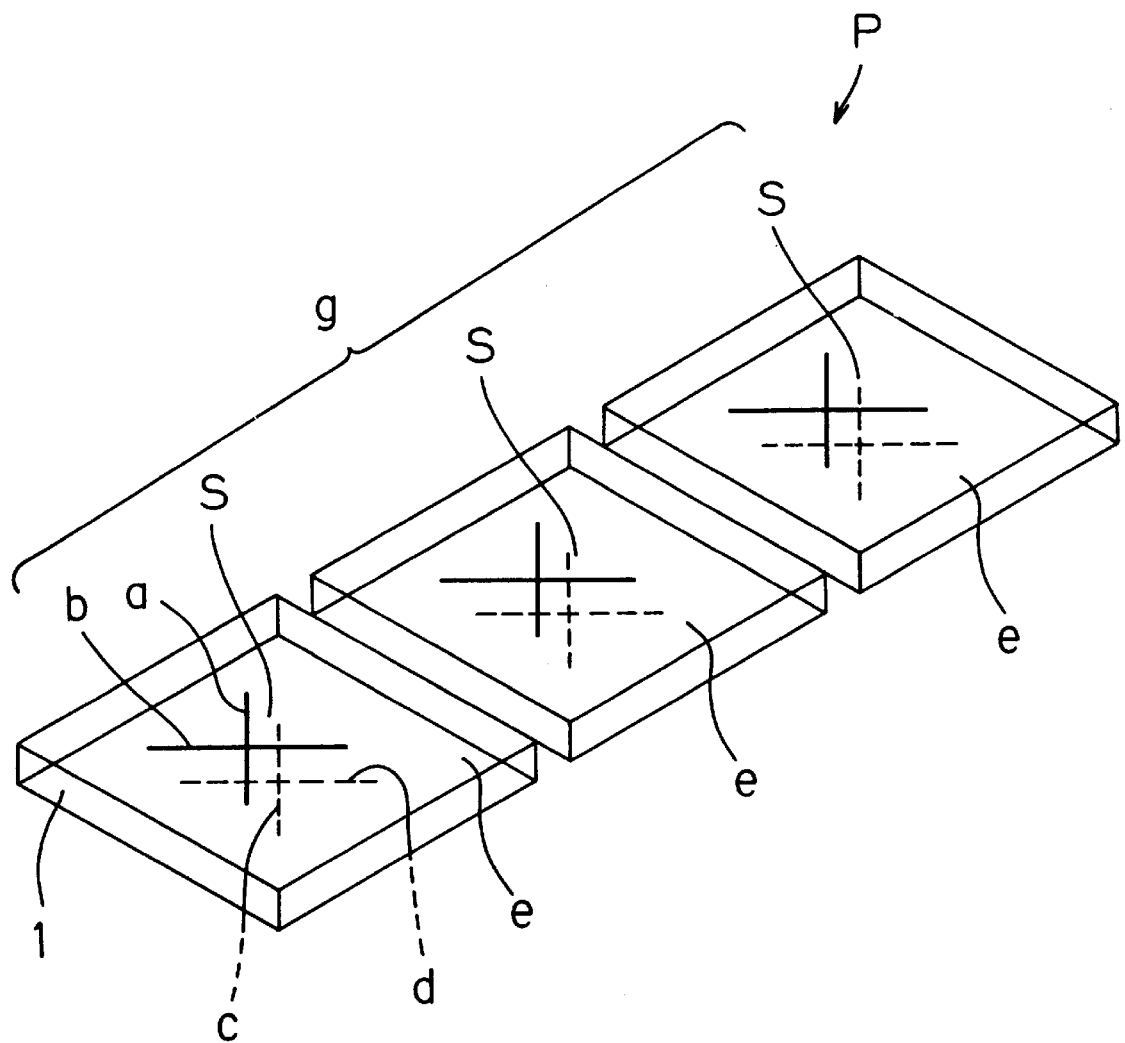
FIG. 1 is a perspective view of a 1-direction sensor segment.

FIG. 1 shows an example of the basic arrangement of a 1-direction stress composite sensor, wherein strain gauges a, b, c, d formed of metal resistance foil are fixed, in pairs with the two in each pair crossing each other, on the opposite surfaces of a base plate 1 made of a plastic material such as epoxy resin, metal or silicon material so as to form a stress sensor S, which is a sensor element, a plurality of such sensor elements being integrally connected together on the same plane to form a sensor segment g; each stress sensor S is used to measure stresses in one direction or a selected sensor segment is used to measure stresses in one direction.

Figure 2:
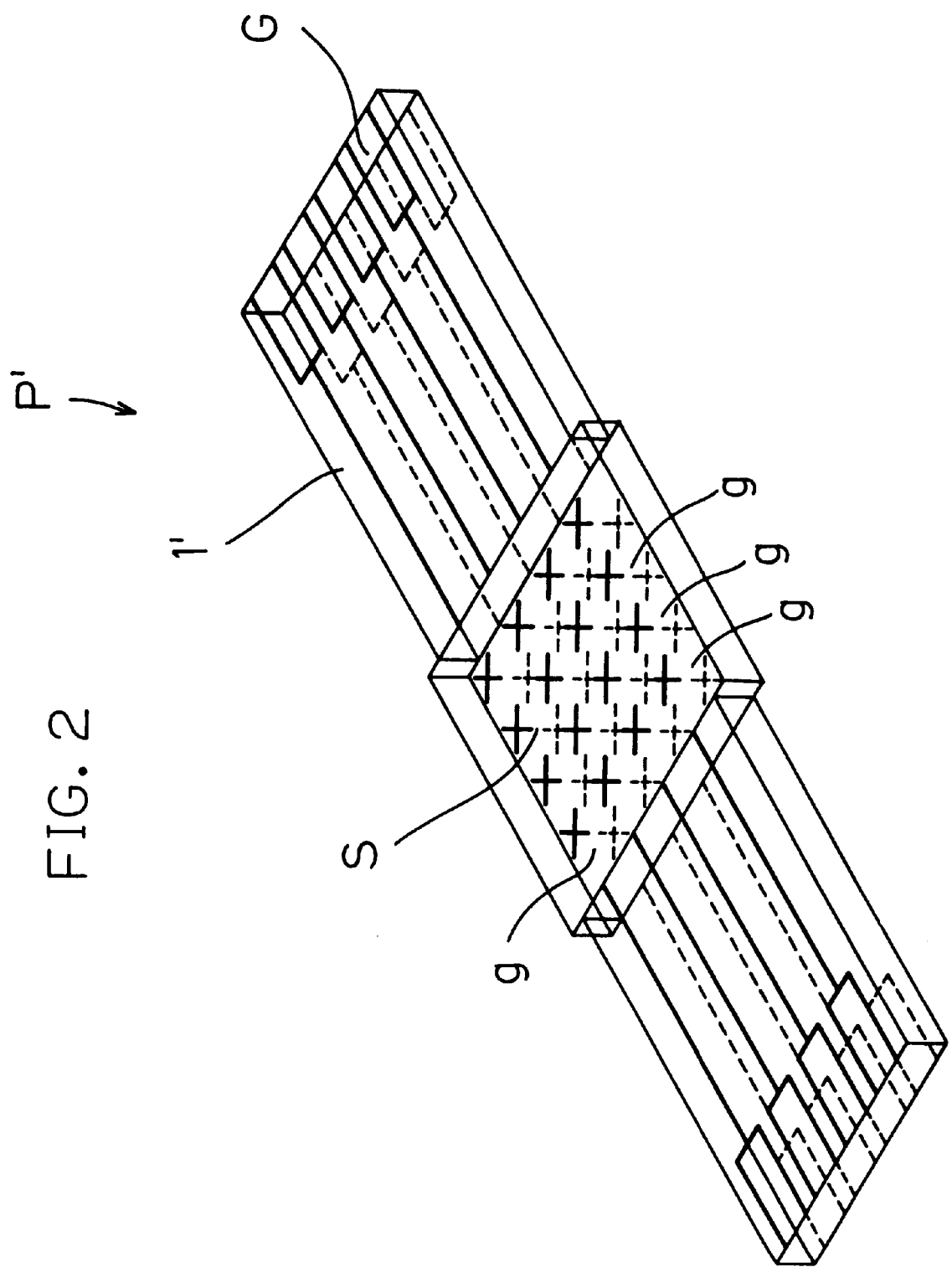
FIG. 2 is a perspective view of a 1-direction stress composite sensor.

In FIG. 2, a plurality of rows of sensor segments g as shown in FIG. 1 are prepared and signal processing circuits G such as bridge circuits and amplifying circuits are integrally formed on a a common base plate 1 into a single package to provide a stress composite sensor P', so that each stress sensor S in the sensor segments g or the stress sensors S in selected sensor segments g alone are used to measure stresses in one direction.

Figure 3:
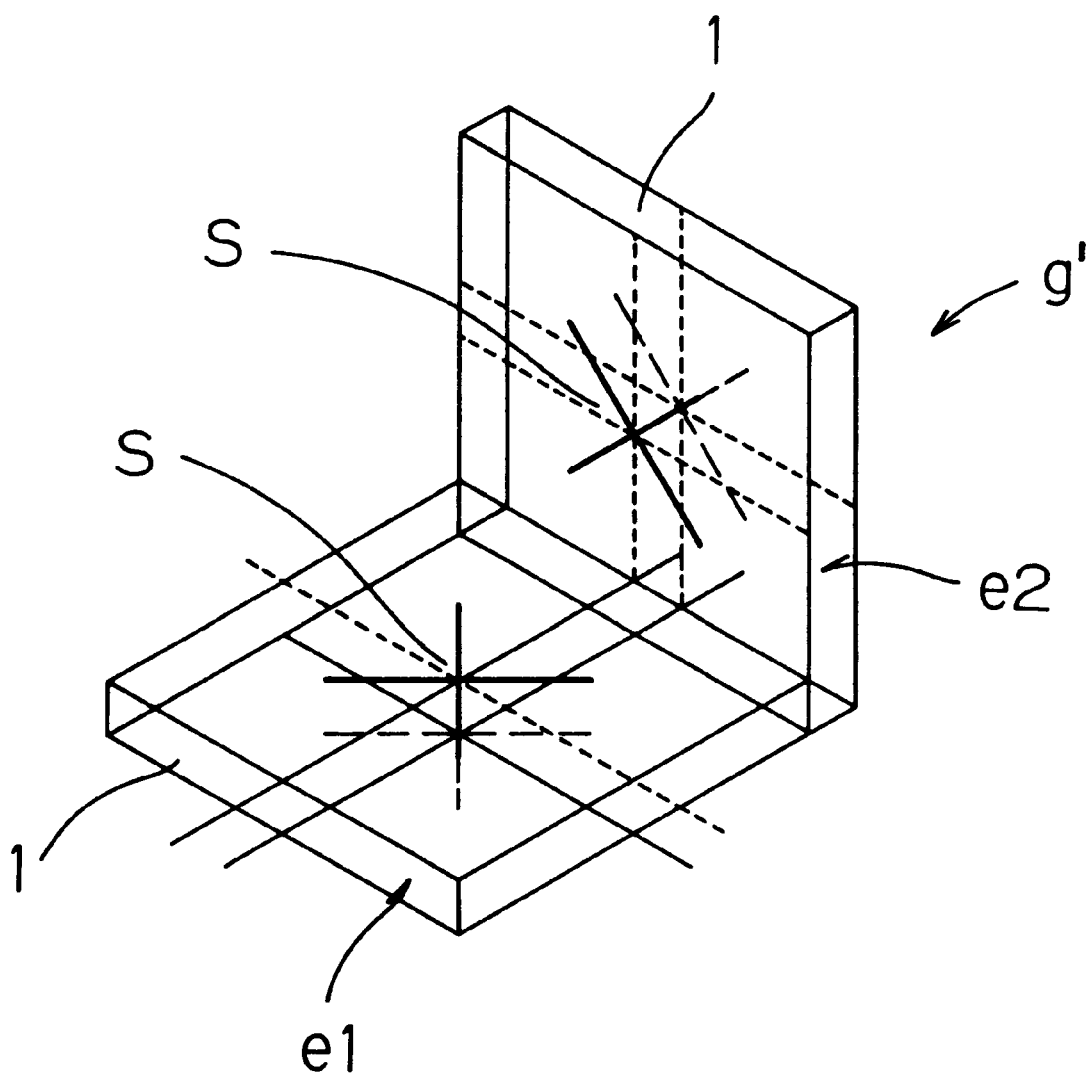
FIG. 3 is a perspective view of a 2-direction sensor segment.

FIG. 3 shows an example of the basic arrangement of a 2-direction stress composite sensor, wherein sensor elements e1 and e2 which have stress sensors S fixed thereto and which are integrally connected together at right angles to form a sensor segment g', so that stresses in two directions, X- and Z-axis directions, can be measured.

Figure 4:
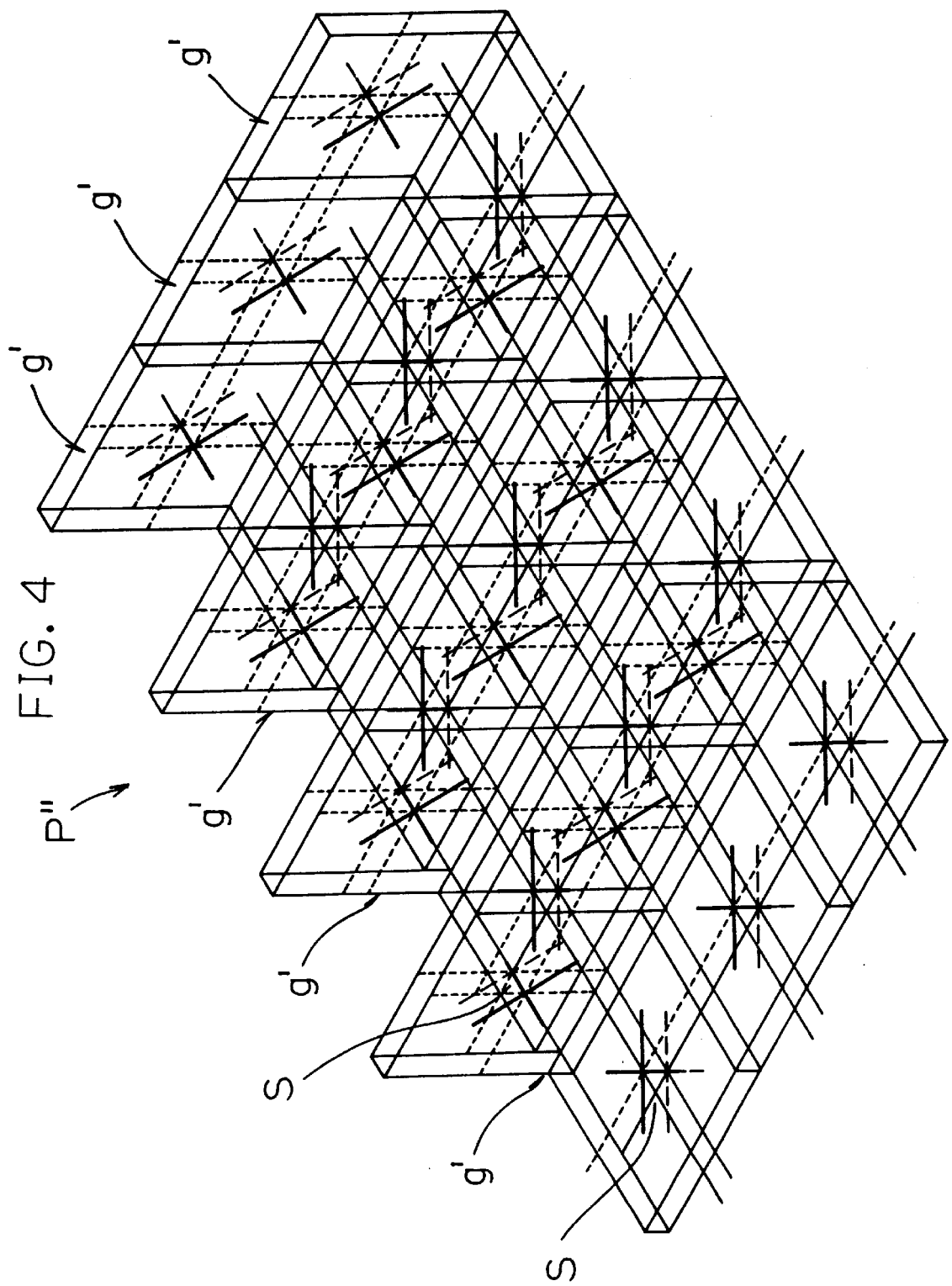
FIG. 4 is a perspective view of a 2-direction stress composite sensor.

In FIG. 4, a plurality of the sensor segments g' (in 4 lateral rows and 3 longitudinal rows) shown in FIG. 3 are integrally connected together to form a 2-direction stress composite sensor P", so that stresses in two directions can be measured by each sensor element e in the sensor segments in the X- and Z-axis directions or by the stress sensors S in selected sensor elements e.

Figure 5:
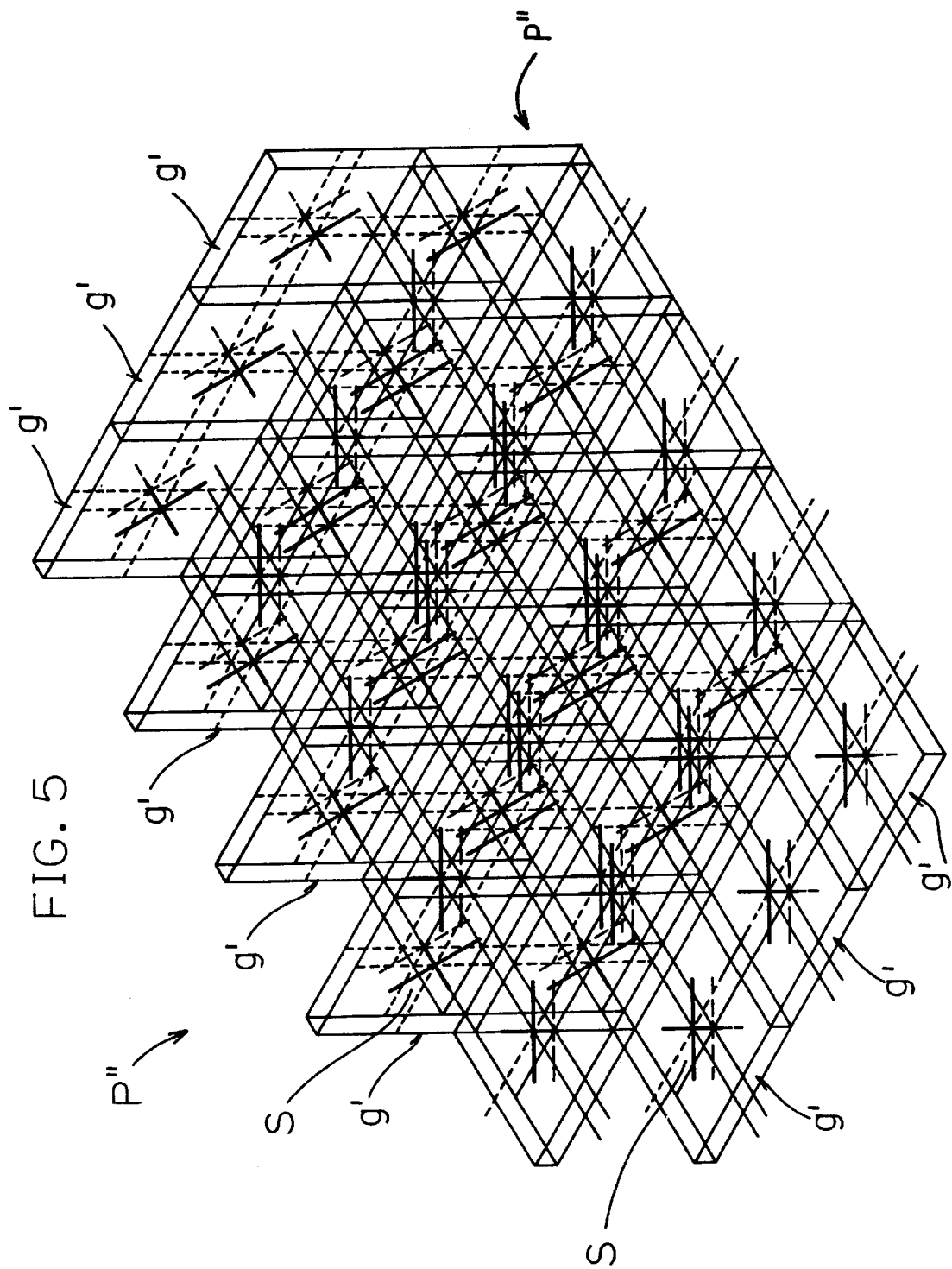
FIG. 5 is a perspective view of a laminated 2-direction stress composite sensor.

In FIG. 5, 2-direction stress composite sensors P" shown in FIG. 4 are laminated in multilayer (in two layers) and connected together, whereby 2-direction stress composite sensors are formed into a single package.

Figure 6:
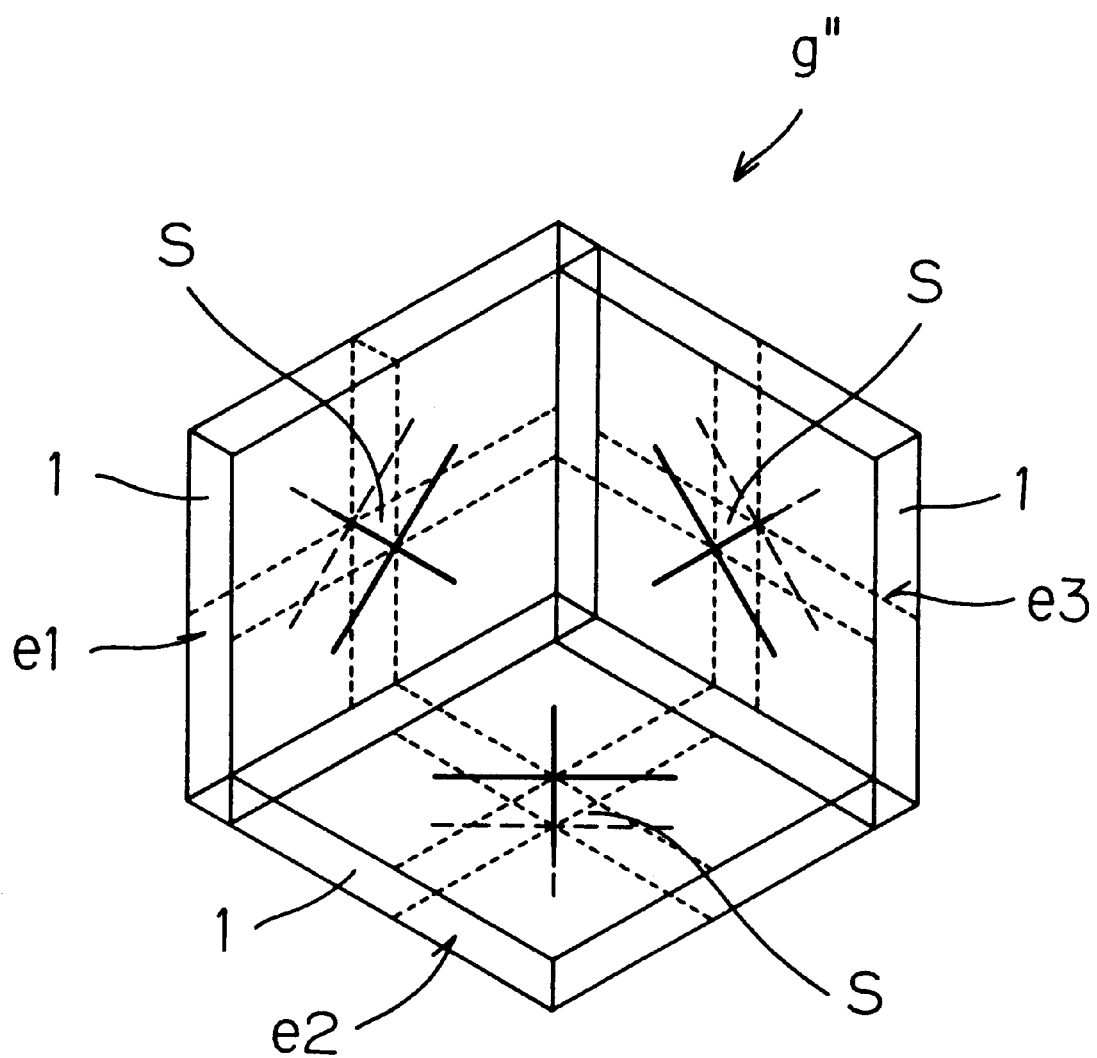
FIG. 6 is a perspective view of a 3-direction sensor segment.

FIG. 6 shows an example of the basic arrangement of a 3-direction stress composite sensor, three sensor elements having stress sensors S fixed on base plates 1 are integrally connected in the three directions of the X-, Y- and Z-axes to form a sensor segment g''', so that individual stresses are measured by the individual stress sensors S, whereby stresses in three directions can be measured.

Figure 7:
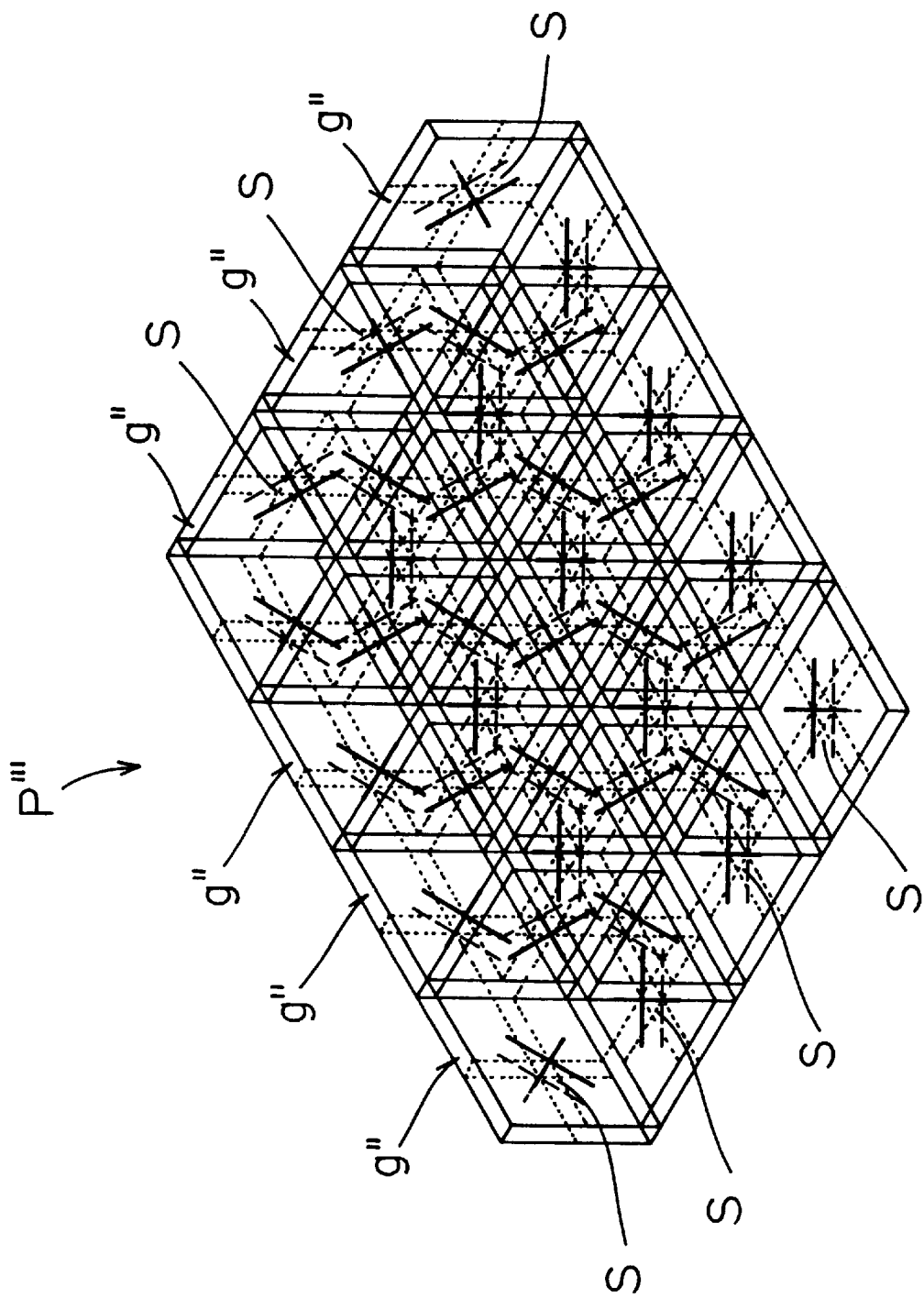
FIG. 7 is a perspective view of a 3-direction stress composite sensor.

In FIG. 7, a plurality of sensor segments g'' (in 4 lateral rows and 3 longitudinal rows) as shown in FIG. 6 are integrally connected together to form a 3-direction stress composite sensor P''', so that stresses in three directions can be measured by each sensor element in the sensor segments in the X-, Y- and Z-axis directions or by the stress sensors in selected sensor elements e.

Figure 8:
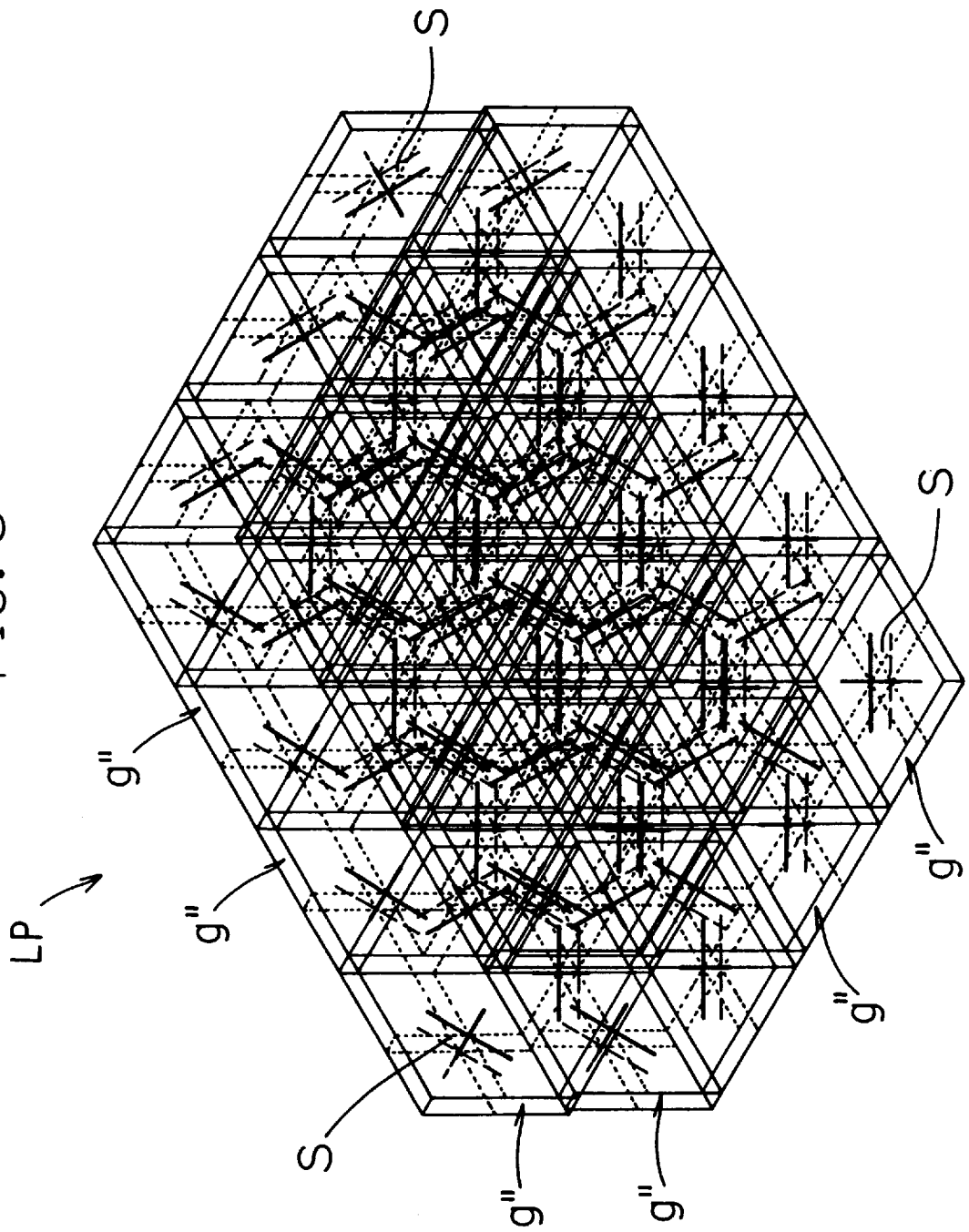
FIG. 8 is a perspective view of a laminated 3-direction stress composite sensor.

In FIG. 8, 3-direction stress composite sensors P''' shown in FIG. 7 are laminated in multilayer (in two layers) and connected together, are formed into a single packaged 3-direction stress composite sensor LP.

Figure 9:
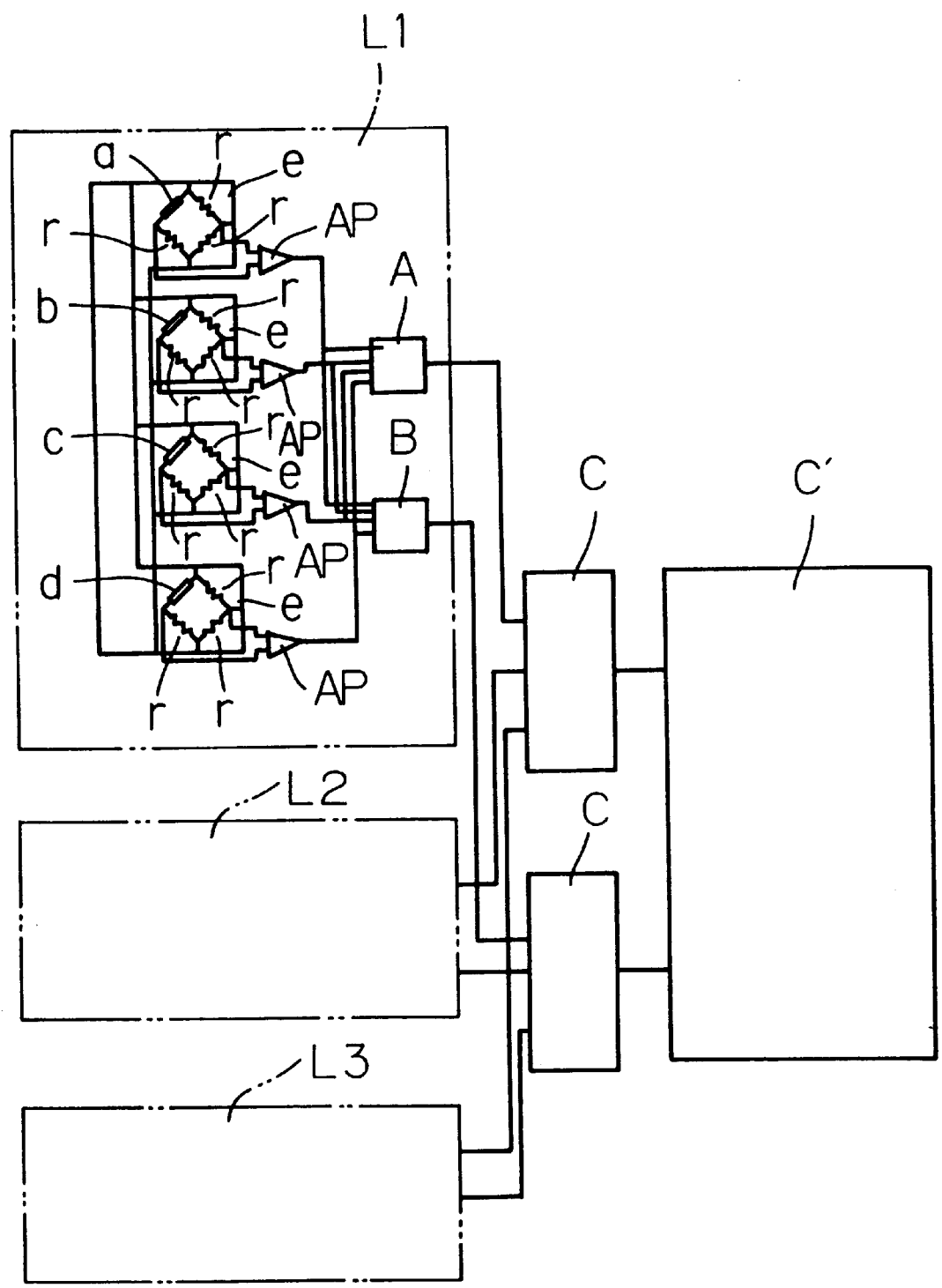
FIG. 9 is a view showing an example of signal processing circuit using 1-direction sensor elements.

The aforesaid 2-direction sensor segment g', 2-direction stress composite sensor P", 3-direction sensor segment g'' and 3-direction stress composite sensor P''' is producible by semiconductor process or made of ceramic or is other material, and a signal processing circuit G such as a bridge circuit or amplifying circuit for the stress sensor S is optionally integrally formed on the same base plate such as a metal base or semiconductor base into a single package, in the same manner with that shown in FIG. 2. Further, in the case where a signal processing circuit is to be integrally formed on the base plate 1 of the sensor segment g shown in FIG. 2, the strain gauges a, b, c, d in each sensor element e together with adjusting resistors r, as shown in FIG. 9, constitute bridge circuits, which are connected to arithmetic circuits A and B through amplifying circuits AP to form a logic circuit L1, the respective outputs from the logic circuits L1—L3 being connected to arithmetic circuits C and C' so as to derive stress signals.

Figure 10:
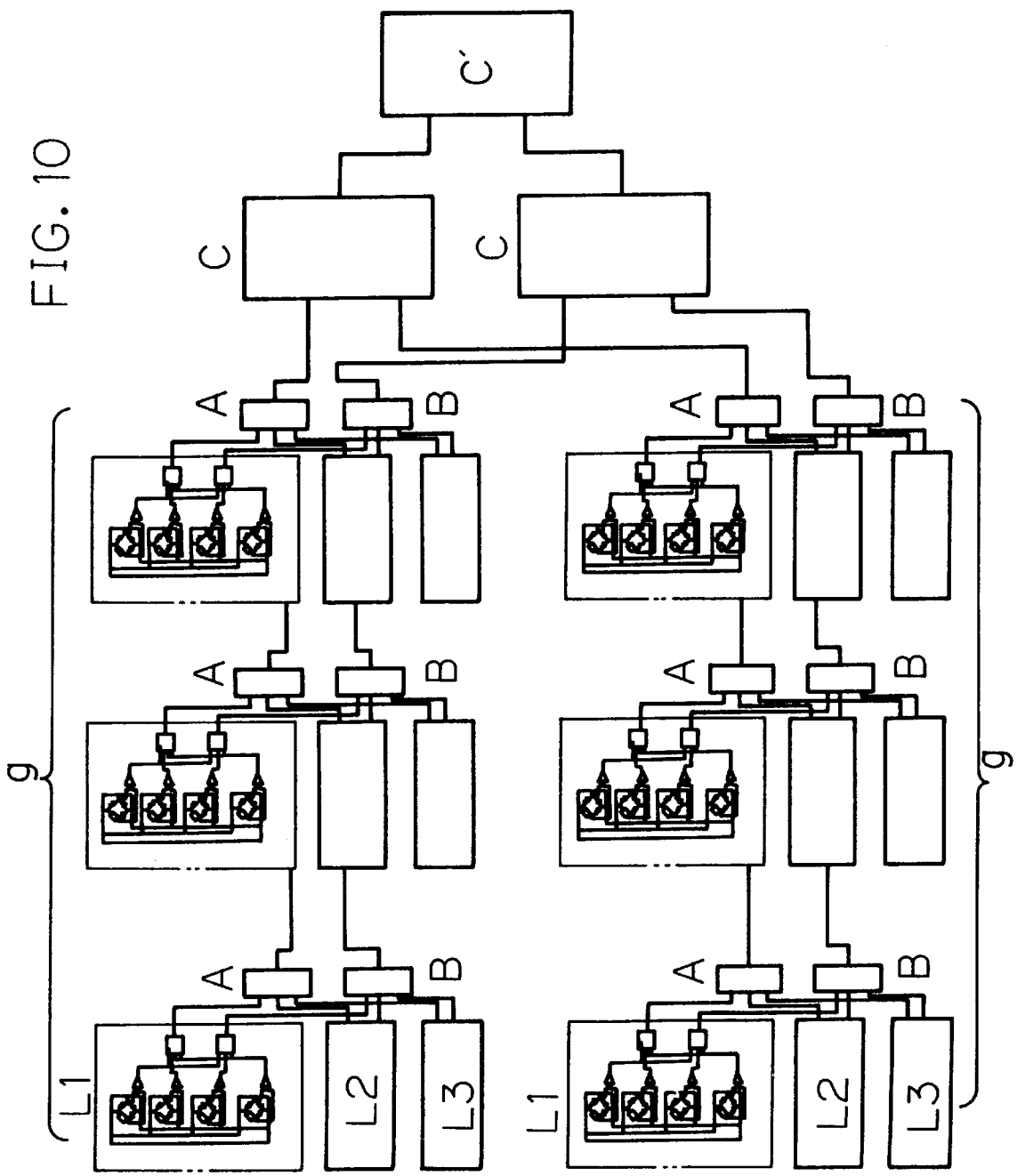
FIG. 10 is a view showing an example of signal processing circuit using two rows of sensor segments connected together.

FIG. 10 shows an example of the arrangement of a signal processing circuit comprising for a 1-direction stress composite sensor comprising two rows of sensor segments g connected together. A signal processing circuit for 2- and 3-direction stress composite sensors can be formed by applying the same idea of forming said signal processing circuit for 1-direction stress composite sensor.

In addition, strain gauges for the stress sensor S have been shown as using metal resistance wire strain gauges, but the invention is not limited thereto and strain gauges based on piezoelectric effect, strain gauges based on crystalline structure, and semiconductor strain gauges are optionally used.

Figure 11:
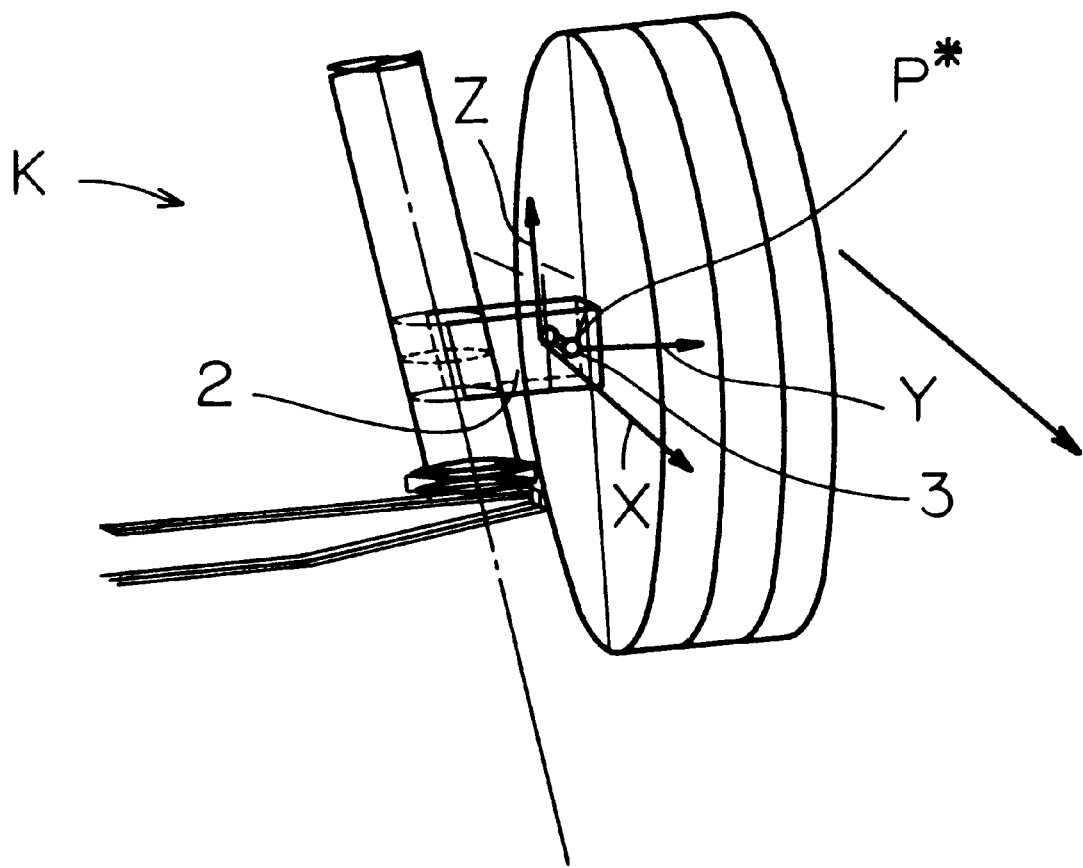
FIG. 11 is a perspective view showing an example in which a 1-direction stress composite sensor is installed in a hole in an axle of a vehicle.

FIG. 11 shows an example of the stress measuring device of the present invention applied to an automobile (structure) K, wherein a hole 3 is formed in an axle 2 in the X-axis direction which is the direction of travel of the vehicle and a stress composite sensor P* capable of measuring stresses in one direction alone or two or three directions is selectively mounted in said hole, thereby constituting the stress measuring device. In this case, the friction force F can be measured in the X-axis direction which is the direction of travel of the vehicle, the transverse force can be measured in the Y-axis direction which is the transverse direction, and the vertical reaction (vertical load) N can be measured in the Z-axis direction which is the vertical direction.

Figure 12:
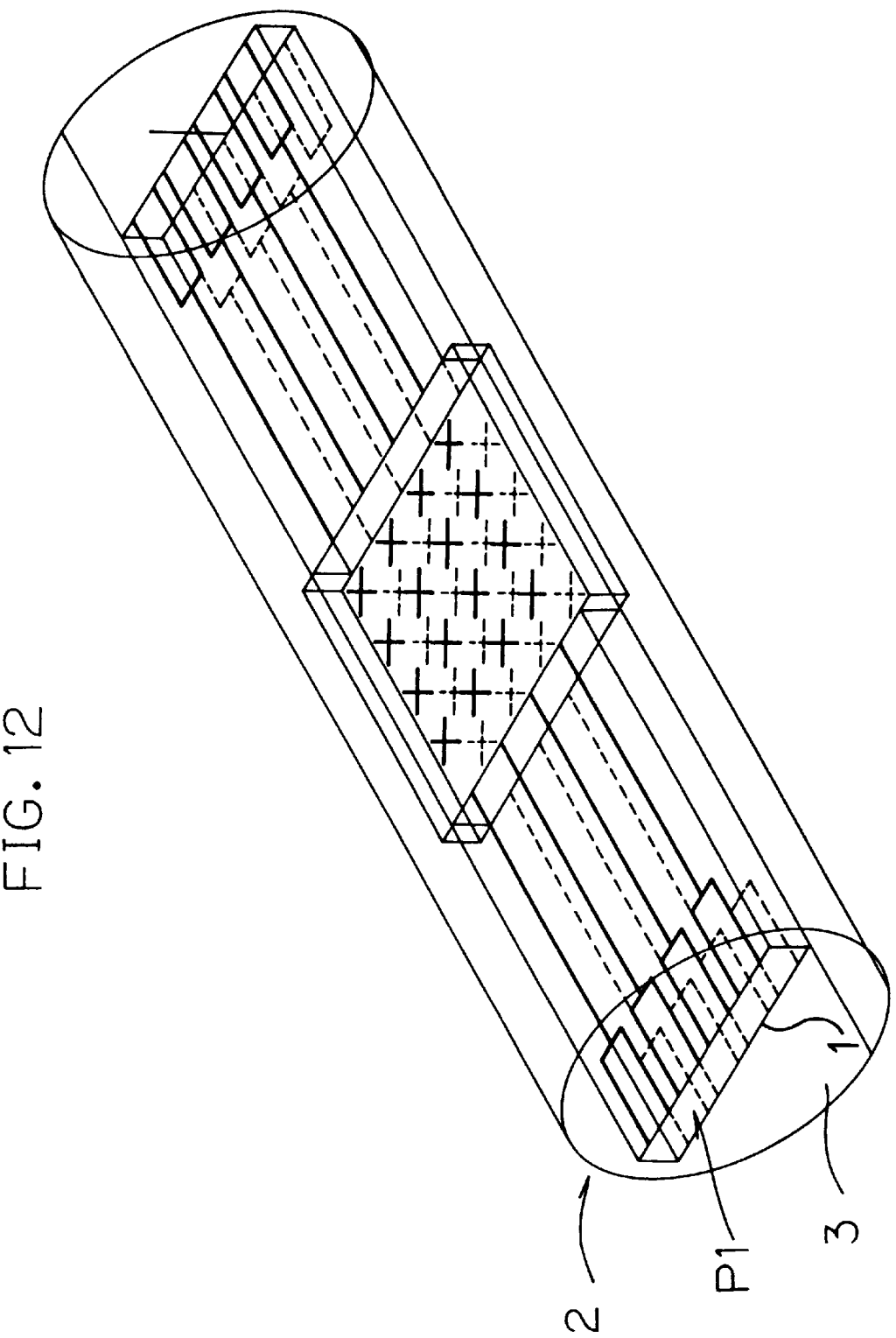
FIG. 12 is an enlarged view of the region where the stress composite sensor is installed in FIG. 11.

FIG. 12 is an enlarged view of stress measuring means comprising a stress composite sensor P1 installed in a hole 3 in an axle 2 for measuring stresses in one direction alone, as shown in FIG. 2, the said stress composite sensor P1 being embedded with the longitudinal edge of its base plate 1 brought into contact with the peripheral wall of the hole 3. If necessary, a filler may be charged into the empty space to provide a waterproof construction.

In this stress measuring device, each stress sensor S of a plurality of rows of equispaced coplanar sensor segments g effects sensing corresponding to shearing strains in the X-axis direction alone produced in the axle 2 to deliver a stress signal; thus, the friction force F can be measured.

Figure 13:
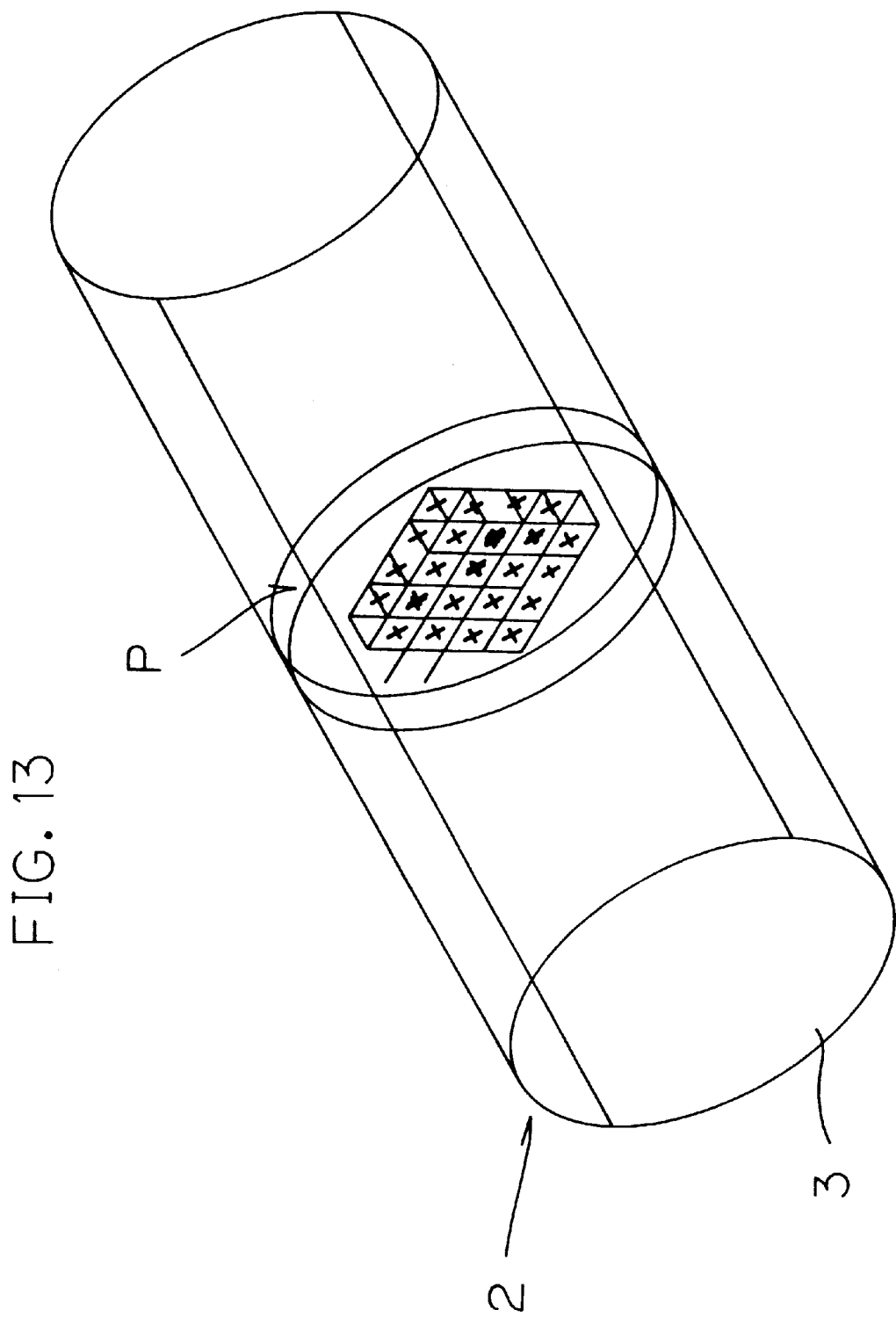
FIG. 13 is a view showing a disk type 1-direction stress composite sensor installed in a hole in an axle of a vehicle.

Further, as shown in FIG. 13, a 1-direction stress composite sensor P may be made in the form of a disk and if it is installed in a hole 3 in an axle at right angles with the X-axis direction, it delivers a stress signal in the vertical direction alone to make it possible to measure the vertical load N.

Figure 14:
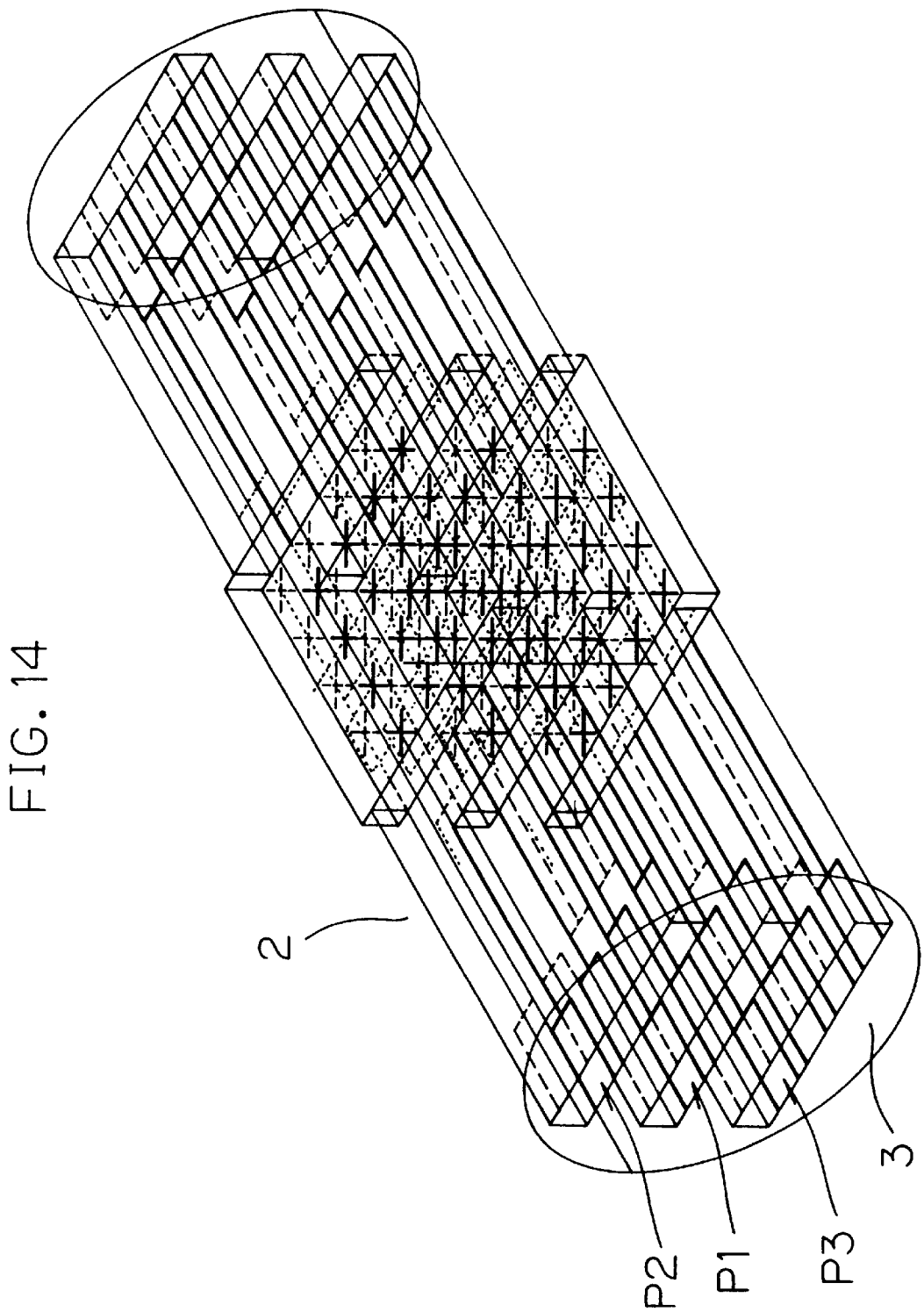
FIG. 14 is a view showing a plurality of 1-direction stress composite sensors installed in the same hole in an axle of a vehicle.

FIG. 14 shows an example of a stress measuring device comprising three 1-direction stress composite sensors P1, P2 and P3 installed at intervals in a hole 3 in an axle 2. In this case, the main sensor P1 and sub-sensors P2 and P3 effect sensing in the X-axis direction alone corresponding to shearing strains formed in axle 2 to deliver stress signals, of which 1-direction stress signals optimum for use as brake control parameters are selected to measure the friction force F.

If the 2-direction stress composite sensor P" shown in FIGS. 4 and 5 is installed in the hole 3 in the axle 2 to constitute a stress measuring device, the stress sensors S of many sensor elements effect sensing to deliver stress signals corresponding to shearing strains produced in two directions, the X- and Z-axis directions, in the axle 2, and selected out of said stress signals are those stress signals in the X- and Z-axis directions which are optimum for use as brake control parameters to enable measurement of the friction force F and vertical load N, and the road surface friction coefficient μ can be easily obtained by arithmetically processing their output values.

If the 3-direction stress composite sensor P''' shown in FIGS. 7 and 8 is installed in the hole 3 in the axle 2 to constitute a stress measuring device, the stress sensors S of many sensor elements effect sensing to deliver stress signals corresponding to shearing strains produced in three directions, the X-, Y- and Z-axis directions, in the axle 2, and selected out of said stress signals are those stress signals in the X-, Y- and Z-axis directions which are optimum for use as brake control parameters to enable measurement of the friction force F, vertical load N and transverse force. Furthermore, stresses in particular directions can be measured, namely their directions and values can be measured by sorted stress signals in the X- and Y-axis or X-, Y- and Z-axis directions, and the optimum road surface friction coefficient μ can be easily obtained by arithmetically processing the selected friction force F and vertical load N.

Figure 15:
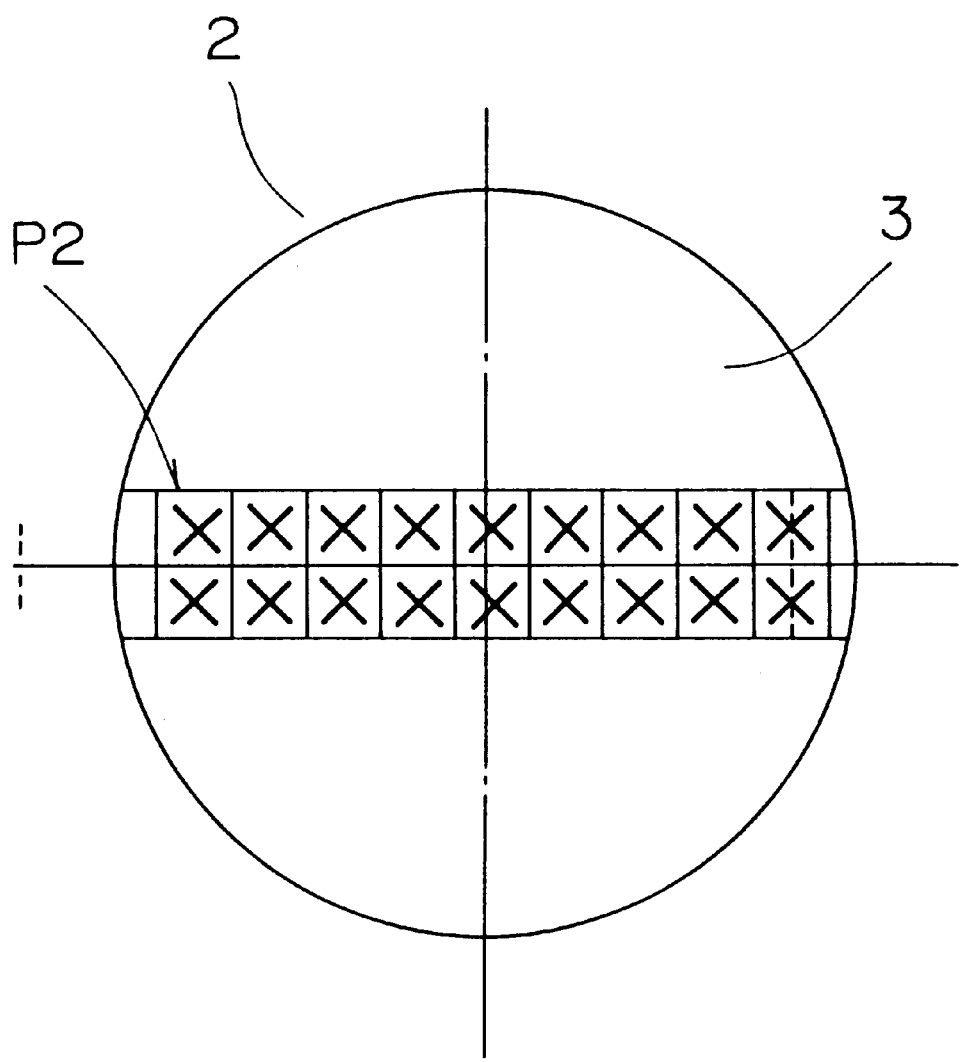
FIG. 15 is a view showing a 2-direction stress composite sensor installed in a hole in an axle.
Figure 16:
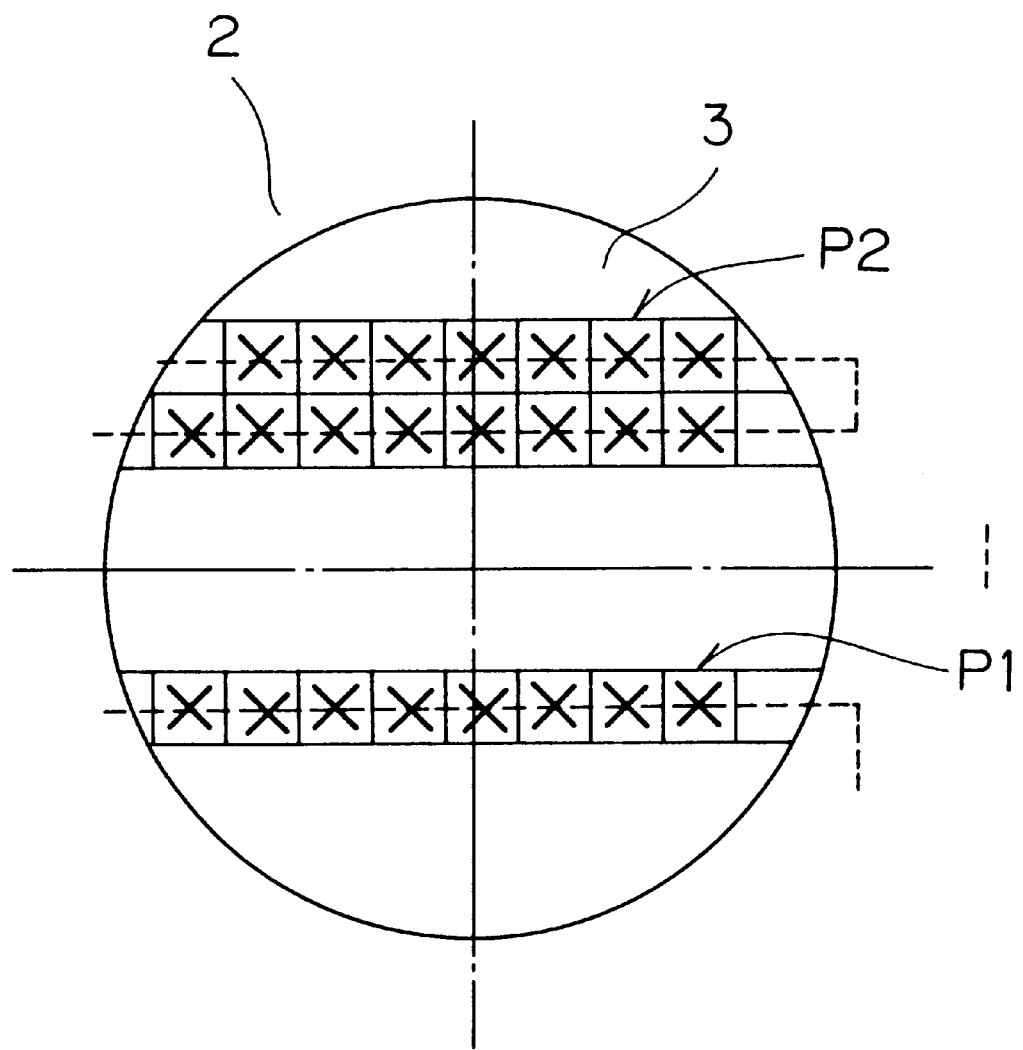
FIG. 16 is a view showing a 1-direction and 2-direction stress composite sensors installed in the same hole in an axle of a vehicle.
Figure 17:
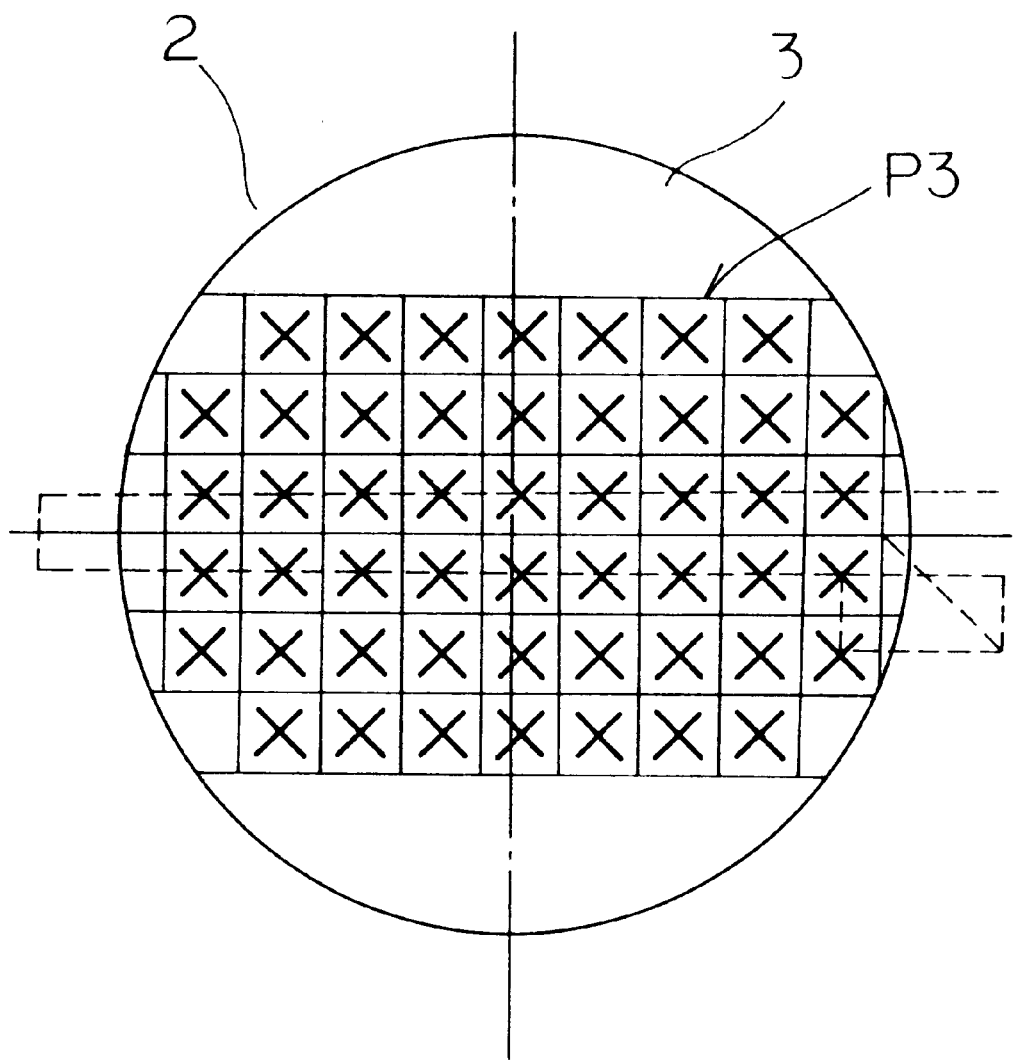
FIG. 17 is a view showing a 3-direction stress composite sensor installed in a hole in an axle.

In the case where the 1-, 2- or 3-direction stress composite sensor P is selected to constitute a stress measuring device, the 2-direction stress composite sensor P2, as shown in FIG. 15, may be installed in the hole 3 in the axle to selectively measure stress signals in the X- or Z-axis direction, or as shown in FIG. 16, the 1- and 2-direction stress composite sensors P1 and P2 may be installed in the hole 3 in the axle with a distance therebetween so that the 1-direction stress composite sensor P1 is used to measure the friction force F which is associated with stress signals in the X-axis direction alone, while the 2-direction stress composite sensor P2 is used to measure the load surface friction coefficient μ. Alternatively, as shown in FIG. 17, a 3-direction stress composite sensor P3 may be installed in the hole 3 in the axle to separately or selectively use all or some of the stress signals in the X-, Y- and Z-axis directions so as to measure all or some of the friction force F, vertical load N and transverse force. Thus, 1-, 2- and 3-direction stress composite sensors P1, p2 and P3 may be used singly or in combination to constitute stress measuring means for obtaining stress signals. Stress composite sensors each obtained by forming into a single package a plurality of stress sensors capable of measuring stresses in one direction or a plurality of directions may be used singly or in combination to effect sensing by stress sensors of a plurality of selected sensor segments alone in the X-axis, X- and Y-axis and X-, Y- and Z-axis directions of the structure, the resulting stress signals being separated according to the X-, Y- and Z-axis directions, and the separated stress signals are respectively added to provide addition stress signals which are then used for comparative computation.

Figure 18:
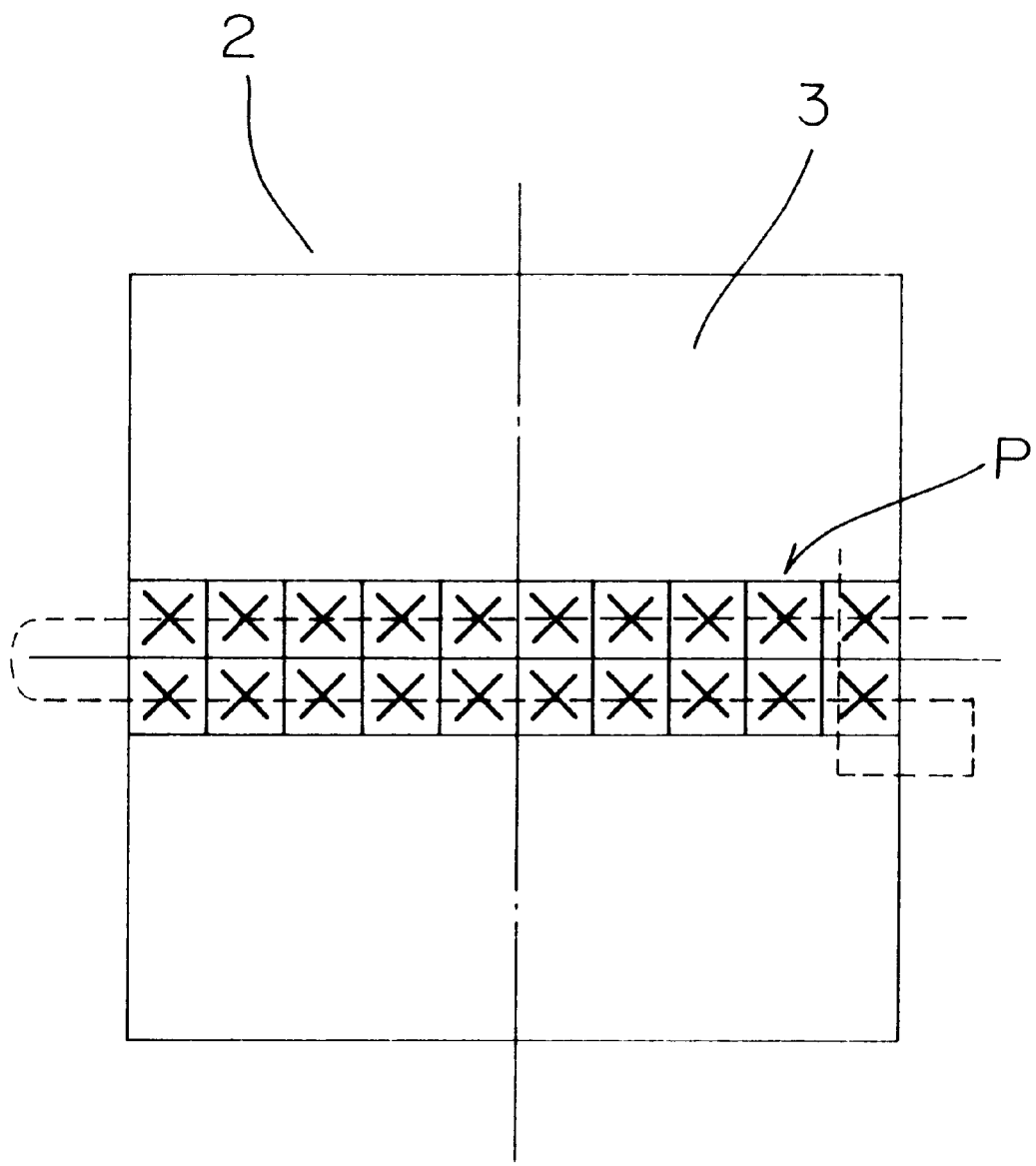
FIG. 18 is a view showing a 2-direction stress composite sensor installed in an angular hole in an axle.

In addition, the hole 3 in the axle may not necessarily be circular; it may be polygonal as shown in FIG. 18, in which case the contact between the stress composite sensor and the peripheral wall of the polygonal hole becomes more intimate, facilitating transfer of shearing strains produced in the axle to the stress composite sensor, ensuring accurate measurement of stresses.

Figure 19:
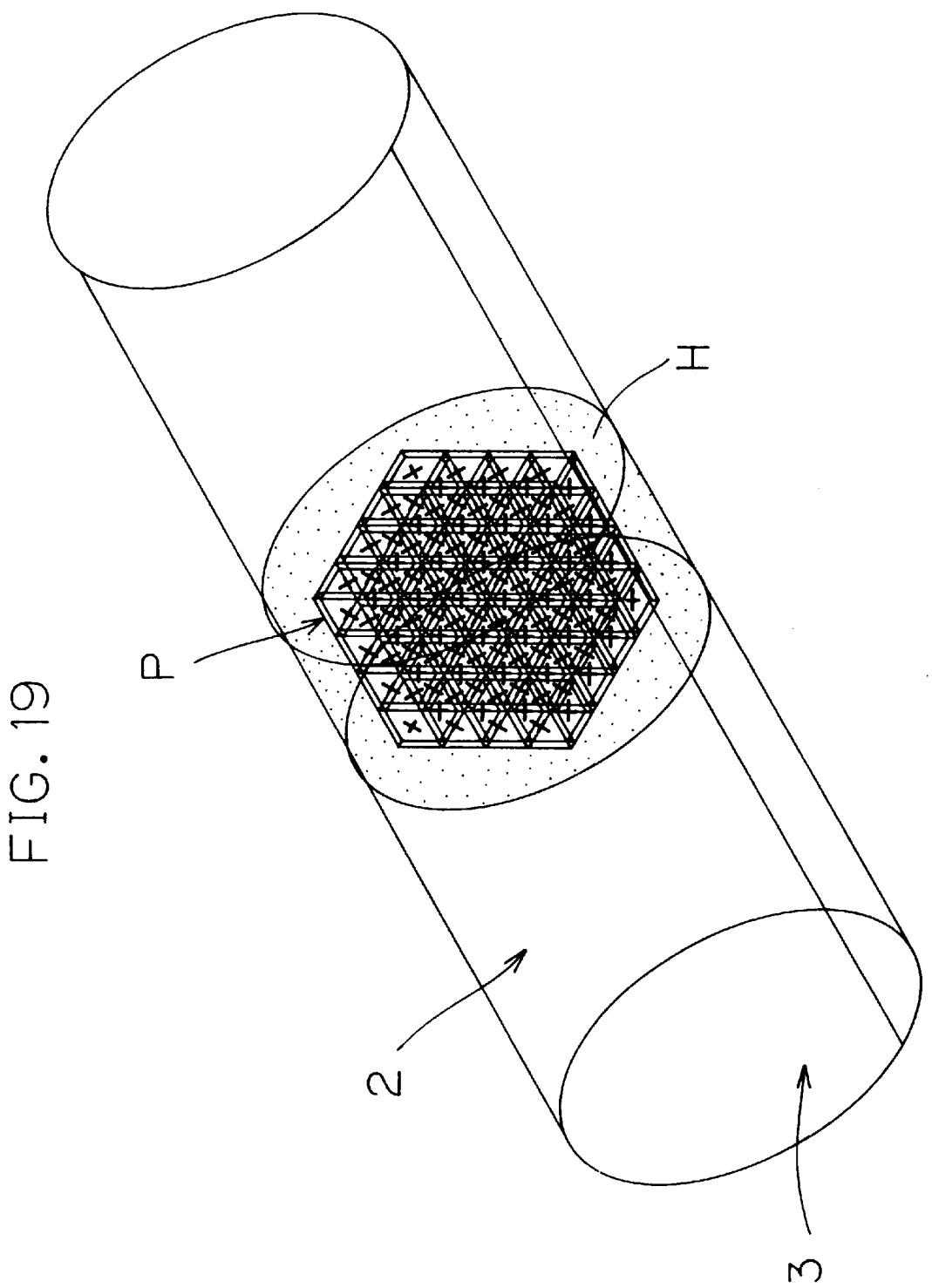
FIG. 19 is a view showing a stress composite sensor installed in a hole in an axle and fixed in position by a filler.

In addition, in the case where a stress composite sensor P is formed into a small-sized single package, as shown in FIG. 19, the stress composite sensor P is inserted in the hole 3 in the axle and fixed therein by charging filler H such as epoxy resin into the empty space, thus constituting a waterproof stress measuring device. Further, a hole 3 of different shape may be formed and a stress composite sensor P may be embedded in said hole in any desired posture to make it possible to measure stresses in a selected direction.

Embodiments in which the stress composite sensor of the present invention is embedded in an axle of a vehicle have been described so far; however, the same functions and effects can be obtained when it is embedded in a strut portion of a vehicle. Further, the invention is not limited to vehicles and is applicable to other structures.

According to the present invention, a stress composite sensor for measuring 1-dimensional, 2-dimensional and 3-dimensional stress directions and stress values can be realized by a single sensor, and when this stress composite sensor is embedded in a structure where 2-dimensionally or 3-dimensionally complicated stresses occur, necessary stress directions and stress values can be measured.

Particularly, if the stress composite sensor according to the invention is applied to an axle where 3-dimensionally complicated stresses occur, it is possible to measure selected stresses not influenced by cross talks; thus, a highly safe brake control system can be provided.

What is claimed is:

1. A stress composite sensor comprising:
  sensor elements each including:
    a base plate having a rectangular configuration and a first main surface and a second main surface opposite said first main surface;
    a pair of first strain gauges disposed on said first main surface crossing one another;
    a pair second strain gauges disposed on a said second main surface crossing one another;
    said first pair of strain gauges and said second pair of strain gauges being symmetrically disposed with respect to a center plane of said base plate; and
    bridge circuits incorporating said first pair of strain gauges and said second pair of strain gauges;
    said sensor elements including X-sensor elements for measuring stress in an X-direction and Y-sensor elements for measuring stress in a Y-direction orthogonal to said X-direction;
    arithmetic circuits for calculating stress from outputs of said bridge circuits incorporating said first pair of strain gauges and said second pair of strain gauges;
    said sensor elements being substantially identical to each other with respect to size of said base plates and disposition of said first and second pairs of strain gauges;
    said X-sensor elements having edge portions orthogonally joined to edge portions of said Y-sensor elements to form L-shaped sensor segments outputting X and Y-direction stress signals; and
    said L-shaped sensor segments being edgewise joined together in a matrix to form one assembled body.

2. The stress composite sensor according to claim 1, wherein said sensor elements include Z-sensor elements for measuring stress in a Z-direction orthogonal to both said X-direction and said Y-direction, said Z-sensor elements each being edgewise join to ones of said L-shaped sensor segments orthogonal to said X-sensor elements and said Y-sensor elements thereby forming three contiguous faces of a parallelepiped and outputting X-, Y- and Z-direction stress signals.

3. The stress composite sensor according to claim 1, further comprising:
  a signal processing circuit for processing outputs of said arithmetic circuits of said sensor elements to output said X- and Y-direction stress signals; and
  said bridge circuits including amplifying circuits integrally formed on respective ones of said base plates with said bridge circuits.

4. The stress composite sensor according to claim 1 in combination with a structural element of a structure, comprising:
   said structural element defining a hole in a stress concentration region of the structural element; and
   said stress composite sensor being imbedded in said hole at a predetermined orientation relative to said structural element for measuring shearing stress in the X-and Y-directions.

5. The combination of claim 4, wherein at least one or more of said sensor elements or said L-shaped sensor segments are selected for stress measurement.

6. The stress composite sensor according to claim 1 in combination with a structural element of a structure, comprising:
   said structural element defining a hole in a stress concentration region of the structural element;
   said stress composite sensor being imbedded in said hole at a predetermined orientation relative to said structural element for measuring shearing stress in the X- and Y-directions; and
   said arithmetic circuits including summing circuits summing respectively said X- and Y-direction stress signals of said L-shaped sensor segments.

7. The combination according to claim 6 further comprising means for effecting comparative computation using said X- and Y-direction summed stress signals of said L-shaped sensor segments.

8. The combination of claim 7, wherein said stress composite sensor is disposed in said hole such that a plurality of said L-shaped sensor segments are disposed in a stress layer having substantially minimized mixing of stresses produced in the structure, and said arithmetic circuits select X-direction and Y-direction stress signals from said plurality of said L-shaped sensor segments and respectively combine said X-direction and Y-direction stress signals.

9. The combination of claim 7, wherein stresses in the X and Y-directions are selected to measure stress in a plurality of directions, the resulting stress signals being used as control parameters.

10. A stress composite sensor comprising:
    sensor elements each including:
       a base plate having a rectangular configuration and a first main surface and a second main surface opposite said first main surface;
       a pair of first strain gauges disposed on said first main surface crossing one another;
       a pair second strain gauges disposed on a said second main surface crossing one another;
       said first pair of strain gauges and said second pair of strain gauges being symmetrically disposed with respect to a center plane of said base plate; and
       bridge circuits incorporating said first pair of strain gauges and said second pair of strain gauges;
    said sensor elements including X-sensor elements for measuring stress in an X-direction, Y-sensor elements for measuring stress in a Y-direction orthogonal to said X-direction, and Z-sensor elements for measuring stress in a Z-direction orthogonal to both said X-direction and said Y-direction;
    arithmetic circuits for calculating stress from outputs of said bridge circuits incorporating said first pair of strain gauges and said second pair of strain gauges;
    said sensor elements being substantially identical to each other with respect to size of said base plates and disposition of said first and second pairs of strain gauges;
    said X-sensor elements having edge portions orthogonally joined to edge portions of said Y-sensor elements to form L-shaped sensor segments;
    said Z-sensor elements each being edgewise join to ones of said L-shaped sensor segments orthogonal to said X-sensor elements and said Y-sensor elements thereby forming three plane sensor segments having three contiguous faces of a parallelepiped to output X-, Y- and Z-direction stress signals; and
    said three plane sensor segments being joined together in a matrix to form one assembled body.

11. The stress composite sensor according to claim 10, further comprising:
    a signal processing circuit for processing outputs of said arithmetic circuits of said sensor elements to output said X-, Y- and Z-direction stress signals; and
    said bridge circuits including amplifying circuits integrally formed on respective ones of said base plates with said bridge circuits.

12. The stress composite sensor according to claim 10 in combination with a structural element comprising:
    said structural element defining a hole in a stress concentration region of the structural element; and
    said stress composite sensor being imbedded in said hole at a predetermined orientation relative to said structural element for measuring shearing stress in the X-, Y- and Z-directions.

13. The combination of claim 12, wherein at least one or more of said sensor elements or said three plane sensor segments are selected for stress measurement.

14. The stress composite sensor according to claim 10 in combination with a structural element of a structure, comprising:
    said structural element defining a hole in a stress concentration region of the structural element;
    said stress composite sensor being imbedded in said hole at a predetermined orientation relative to said structural element for measuring shearing stress in the X-, Y- and Z-directions; and
    said arithmetic circuits including summing circuits summing respectively said X-, Y- and Z-direction stress signals of said three plane sensor segments.

15. The combination according to claim 14 further comprising means for effecting comparative computation using said X-, Y- and Z-direction summed stress signals of said three plane sensor segments.

16. The combination of claim 14, wherein said stress composite sensor is disposed in said hole such that a plurality of said three plane sensor segments are disposed in a stress layer having substantially minimized mixing of stresses produced in the structure, and said arithmetic circuits select X-direction, Y-direction, and Z-direction stress signals from said plurality of said three plane sensor segments and respectively combine said X-direction, Y-direction, and Z-direction stress signals.

17. The combination of claim 14, wherein stresses in the X-direction, Y-direction, and Z-direction are selected to measure stress in a plurality of directions, the resulting stress signals being used as control parameters.

* * * * *